United States Patent [19]
Phillips

[11] 3,910,135
[45] Oct. 7, 1975

[54] ACCELERATOR HOLDING DEVICE

[76] Inventor: Alan C. Phillips, 19447 Baugh St. NW., Elk River, Minn. 55330

[22] Filed: Apr. 25, 1974

[21] Appl. No.: 464,203

[52] U.S. Cl. .................................. 74/532; 74/511
[51] Int. Cl.² ......................................... G05G 5/12
[58] Field of Search ............... 74/532, 482; 192/3 T

[56] References Cited
UNITED STATES PATENTS

| | | | |
|---|---|---|---|
| 3,226,997 | 1/1966 | Malloy | 74/482 |
| 3,315,539 | 4/1967 | Solberg | 74/532 |
| 3,749,212 | 7/1973 | Black | 192/3 T |

*Primary Examiner*—Samuel Scott
*Assistant Examiner*—F. D. Shoemaker
*Attorney, Agent, or Firm*—Williamson, Bains & Moore

[57] ABSTRACT

An accelerator pedal holding device for a vehicle includes a mounting structure and a longitudinally adjustable elongate pedal engaging structure which engages the accelerator pedal. The mounting structure is adapted to engage either the vehicle seat or the steering wheel to thereby cause the pedal engaging structure to hold the accelerator pedal in a predetermined depressed condition.

4 Claims, 3 Drawing Figures

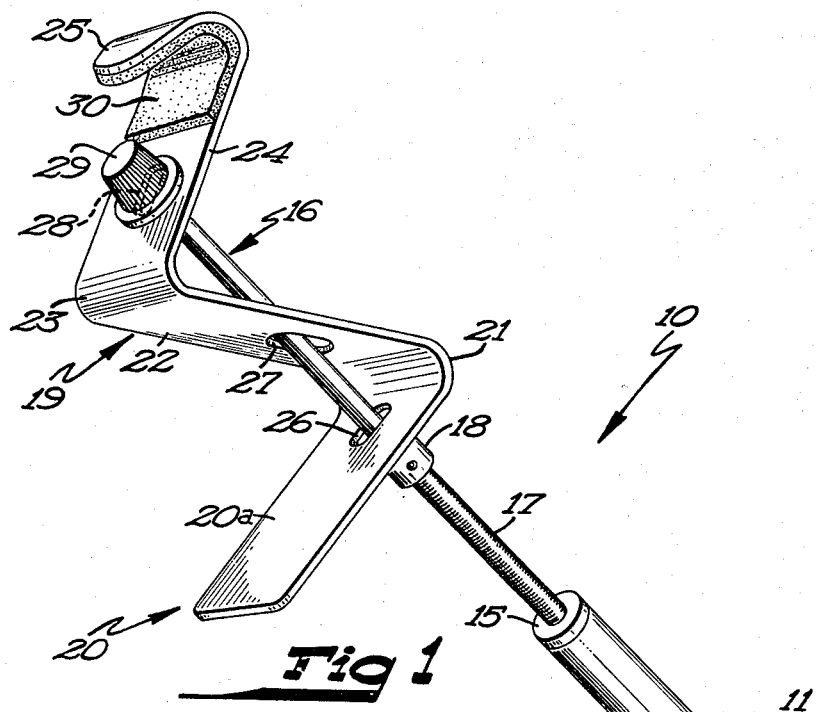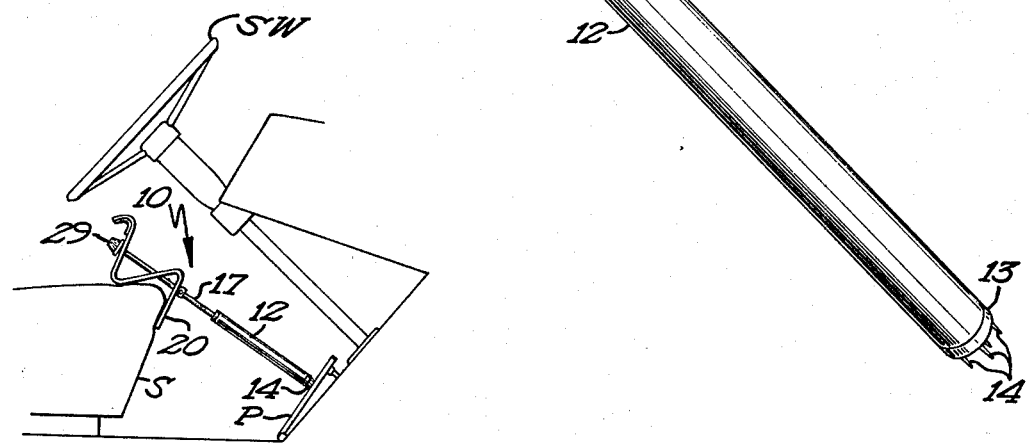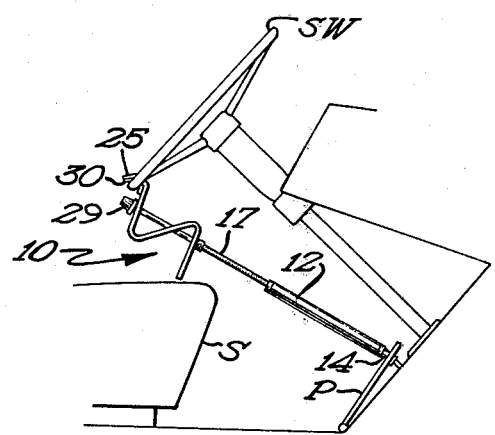

ACCELERATOR HOLDING DEVICE

SUMMARY OF THE INVENTION

This invention relates to an accelerator holding device for a vehicle which is operable to hold the accelerator pedal in a predetermined depressed condition for controlling and maintaining the speed of the automobile engine to permit the engine to be warmed quickly during cold, inclement weather.

Although there have been a number of prior art devices devised for use in holding the accelerator pedal of vehicles in a predetermined depressed condition, these prior art devices are limited with respect to the specific vehicles with which they may be used. For example, these prior art devices are specifically designed to engage some particular interior structural part of the vehicle, such as the seat, steering wheel, or floor boards, when holding the accelerator pedal in the depressed condition. However, because of the variations of the interior design and dimensions of different kinds of vehicles, these prior art devices have been specifically constructed to engage a particular interior part of a particular vehicle. Thus these prior art devices are limited in their use.

It is an object of this invention to provide an accelerator pedal holding device for a vehicle which includes a longitudinally adjustable accelerator pedal engaging structure and a mounting structure, the latter being adapted to be positioned in mounted relation selectively on either the seat or the steering wheel of the vehicle, thereby permitting the present device to be used with a number of different kinds of vehicles.

Another feature of the present invention is the provision of the accelerator pedal engaging structure with a plurality of penetrating elements which assures a positive non-slipping contact with the accelerator pedal when the instant device is applied thereto.

These and other objects and advantages of this invention will more fully appear from the following description made in connection with the accompanying drawings wherein like reference characters refer to the same or similar parts throughout the several views.

FIGURES OF THE DRAWINGS

FIG. 1 is a perspective view of the accelerator pedal holding device;

FIG. 2 is a diagrammatic side elevational view thereof illustrating the device extending between the vehicle seat and the accelerator pedal;

FIG. 3 is a diagrammatic view similar to FIG. 2, but illustrating the accelerator pedal holding device extending between the steering wheel of the vehicle and the accelerator pedal.

DETAILED DESCRIPTION OF THE DRAWINGS

Referring now to the drawings and more specifically to FIG. 1, it will be seen that one embodiment of the novel accelerator holding device, designated generally by the reference numeral 10, is there shown. The accelerator holding device 10 is comprised of an elongate, longitudinally adjustable accelerator engaging structure, preferably formed of a rigid material such as metal, plastic or the like, and including an elongate lower tubular member 12. The lower end of the tubular member 12 is provided with an end member 13 having a plurality of tines or points 14 projecting therefrom. These tines or points are adapted to engage the upper surface of the accelerator pedal with penetrating effect to assure non-slipping contact with the accelerator pedal. The upper end of the lower tubular member 12 is provided with an internally threaded element or nut 15 which is fixedly connected thereto.

The accelerator engaging structure 11 also includes an elongate substantially straight upper member or rod 16 which is disposed in telescoping relation with respect to the lower tubular member 12. The rod member 16 includes a threaded portion 17 which projects interiorly of the tubular member 12 and threadedly engages the threaded nut 15. It will therefore be seen that by producing relative rotation between the lower tubular member 12 and the upper rod member 16, the accelerator pedal engaging structure 11 may be longitudinally adjusted to vary the overall length thereof. A stop collar 18 is mounted on the upper rod member 16 intermediate the ends thereof, the stop collar being provided with a suitable set screw to permit the stop collar to be adjusted with respect to its longitudinal position on the rod member.

The accelerator holding device also includes a mounting structure 19 which is preferably of one-piece construction and which is also formed of a rigid material such as plastic, metal or the like. The mounting structure 19 is mounted on the rod member 16 and includes an angular seat engaging portion 20 which is adapted to engage the front and upper surfaces of the vehicle seats. The seat engaging portion 20 is comprised of the generally vertically extending portion 20a, a first arcuate portion 21, a generally horizontal portion 22 and the second arcuate portion 23. It will be noted that when the seat engaging portion 20 is disposed in engaging relation with the seat, the first arcuate engaging portion 21 and parts of the vertical and horizontal portion are spaced from the seat.

The mounting structure 19 also includes an intermediate portion 24 integral with the second arcuate portion and projecting generally vertically therefrom. The intermediate portion 24 is integral with a generally arcuate steering wheel engaging portion 25 which, as shown, is adapted to engage the steering wheel while the holding device is interposed between the accelerator pedal and the steering wheel. It will be noted that the vertical portion 20a has an elongate opening 26 therein, the horizontal portion 22 has an elongate opening 27 therein, and the intermediate portion 24 has an elongate opening 28 therein. The openings 26, 27 and 28 are disposed in longitudinal alignment to accommodate the upper rod member 16 therethrough. It will be noted that the longitudinal dimension of each of said openings 26, 27 and 28 is substantially greater than the diameter of the rod to thereby permit slight vertical angular adjustment of the accelerator pedal engaging structure and the mounting structure 19.

It will be noted that a knob 29 is mounted on the upper end of the rod member 16, and in the embodiment shown, is positioned in close proximity to the intermediate portion 24 of the mounting structure 19. This knob 29 facilitates rotation of the rod member 16 relative to the tubular member 12, when adjusting the overall length of the accelerator engaging structure 11. The lower or bearing surface of the steering wheel engaging portion 25 is provided with a yieldable friction element 30 which is secured thereto. This friction element 30 is comprised of foam rubber or the like and serves to prevent slippage of the mounting member relative to a steering wheel when the accelerator holding device is disposed in engaging relation with the steering wheel.

In use, the accelerator holding device will be adjusted so that when it is applied to the accelerator pedal and either the seat or steering wheel of the vehicle, the accelerator pedal will be depressed to the desired degree. This is accomplished by a trial and error technique in which the accelerator engaging structure is extended or retracted the desired amount. Once adjusted for particular vehicle, it will thereafter be unnecessary to adjust the holding device for use, and it may simply be applied to the vehicle by an operator and will serve to hold the accelerator pedal in a predetermined depressed position as the automobile engine is allowed to warm.

It is pointed out that since the accelerator pedal holding device 10 is longitudinally adjustable, and since it may be readily mounted on either the vehicle seat or steering wheel, the device may be adjusted to function with most automotive vehicles. The penetrating elements on the lower end of the tubular member 12 effectively penetrates the upper surface of the accelerator pedal and thereby assure positive non-slipping contact with the pedal. The elongate openings in the mounting structure through which the rod member 16 projects, also permits sufficient angular adjustment of the accelerator engaging structure, relative to the mounting structure to render the device further adaptable for various style automotive vehicles.

From the foregoing description, it will be seen that I have provided a novel accelerator holding device, which is not only of simple and inexpensive construction, but on which functions in a more efficient manner than any heretofore known comparable structures.

What is claimed is:

1. An accelerator pedal holding device for an atuomotive vehicle, comprising
    an elongate, longitudinally adjustable, accelerator pedal engaging structure, including an elongate lower member having a plurality of penetrating elements at one end thereof for engaging the upper surface of the accelerator pedal with penetrating effect,
    an elongate, upper member telescopically engaging said lower member, cooperating means on said members permitting relative longitudinal adjustment therebetween,
    a mounting structure, mounted on said upper member and including a generally angular seat engaging portion adapted to engage the upper and front surfaces of the vehicle seat, and a generally arcuate steering wheel engaging portion adapted to engage the steering wheel of the vehicle, an intermediate portion integral with said seat engaging portion and with said steering wheel engaging portion, aligned openings in said seat engaging portion and said intermediate portion through which said upper member projects to mount said mounting structure on said upper member, said mounting structure when engaging the vehicle steering wheel or the vehicle seat, and said accelerator pedal engaging structure when engaging the accelerator pedal urging the latter into a predetermined depressed condition to cause the vehicle to idle at a predetermined rate of speed.

2. The accelerator pedal holding device as defined in claim 1, wherein said mounting structure is of single piece construction, friction means on said steering wheel engaging portion of said mounting structure minimizing slipping of the mounting structure with respect to the steering wheel when the mounting structure is disposed in engaging relation with the steering wheel.

3. the accelerator pedal holding device as defined in claim 1 wherein each of the openings in said mounting structures are of a size larger than the cross-sectional size of said rod member to thereby permit angular adjustment of the rod member relative to the mounting structure.

4. The accelerator pedal holding device as defined in claim 1 wherein said cooperating means on said members includes an external threaded portion on one of said members and an internal threaded portion on the outer of said members.

* * * * *